United States Patent [19]

Bullock et al.

[11] Patent Number: 5,515,792
[45] Date of Patent: May 14, 1996

[54] RAIL CAR BRIDGE PLATE

[75] Inventors: Robert L. Bullock; Bruce M. Bullock, both of Antioch, Ill.; Dallas S. Drew, Sequim, Wash.; Michael C. Burkitt, Irvine, Calif.

[73] Assignee: Standard Car Truck Company, Park Ridge, Ill.

[21] Appl. No.: 501,730

[22] Filed: Jul. 12, 1995

Related U.S. Application Data

[63] Continuation-in-part of Ser. No. 161,755, Dec. 3, 1993, abandoned.

[51] Int. Cl.⁶ .................................................. B61D 49/00
[52] U.S. Cl. ............................................................ 105/458
[58] Field of Search .................................. 105/396, 422, 105/425, 436, 457, 458, 459, 460, 401; 296/50, 51, 52, 53, 55, 56, 57.1, 59, 61

[56] References Cited

U.S. PATENT DOCUMENTS

| 66,419 | 7/1867 | Traxler. |
|---|---|---|
| 68,327 | 8/1867 | Wilcox. |
| 84,808 | 12/1868 | Elder. |
| 2,052,867 | 9/1936 | Cartzdafner et al.. |
| 2,788,751 | 6/1957 | Russell. |
| 3,001,266 | 9/1961 | Kilbane et al.. |
| 3,195,478 | 7/1965 | Thompson. |
| 3,203,364 | 12/1966 | Gutridge. |
| 3,323,472 | 6/1967 | Boone et al.. |
| 3,370,552 | 2/1968 | de Podesta et al.. |
| 3,421,454 | 1/1969 | Connerat. |
| 3,572,254 | 3/1971 | Slager. |
| 4,721,426 | 1/1988 | Bell et al.. |
| 5,004,287 | 4/1991 | Doyle. |
| 5,010,614 | 4/1991 | Braemert et al.. |
| 5,244,335 | 9/1993 | Johns. |
| 5,312,149 | 5/1994 | Boone. |

FOREIGN PATENT DOCUMENTS

| 9162 | 3/1902 | Austria. |
|---|---|---|
| 539581 | 11/1931 | Germany. |
| 806859 | 4/1951 | Germany. |
| 947078 | 7/1956 | Germany. |
| 5139295 | 6/1993 | Japan. |
| 37273 | 1/1914 | Sweden. |

Primary Examiner—Mark T. Le
Attorney, Agent, or Firm—Dorn, McEachran, Jambor & Keating

[57] ABSTRACT

A bridge plate assembly for use in moving vehicles between rail cars for unloading and loading has a sufficient length to span the space between adjacent rail cars and has sufficient width to accommodate vehicles of varying wheelbase. The plate assembly includes two load bearing plate members, positioned one on top of another, with one end of each plate member being formed and adapted to be attached to the end of a rail car. Each plate member has top and bottom face layers bonded to an intermediate low density core.

28 Claims, 3 Drawing Sheets

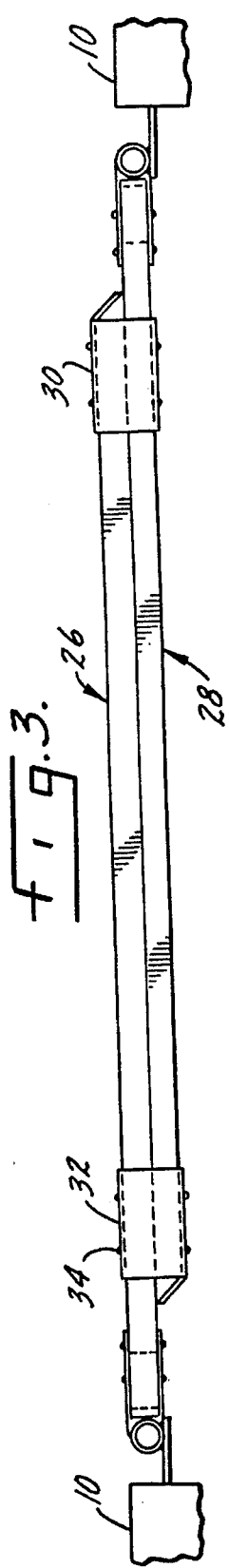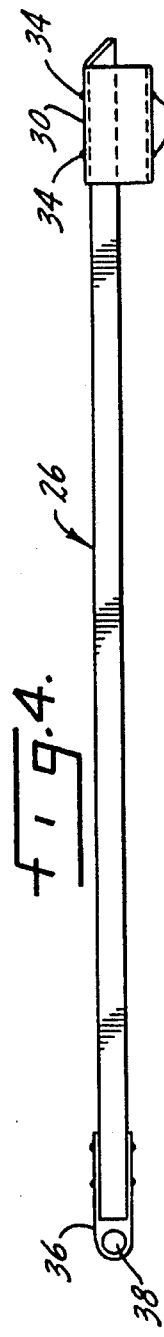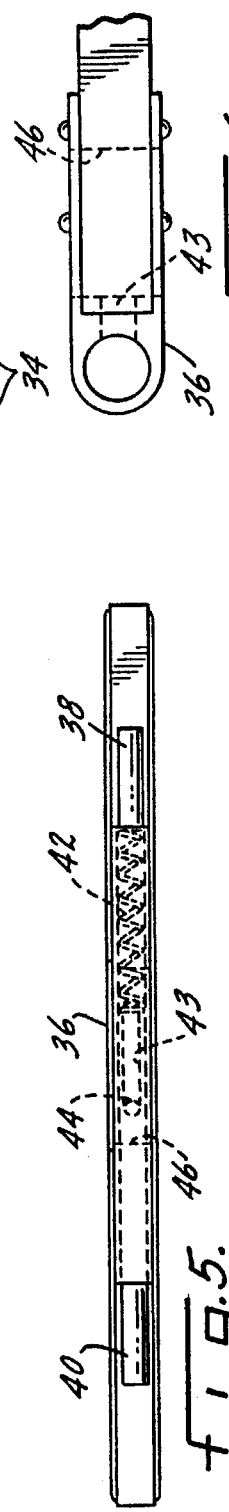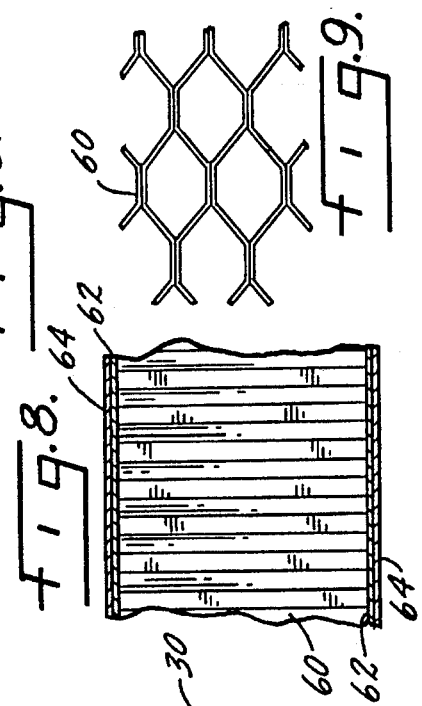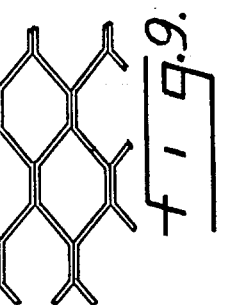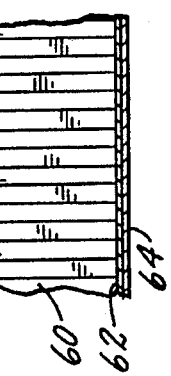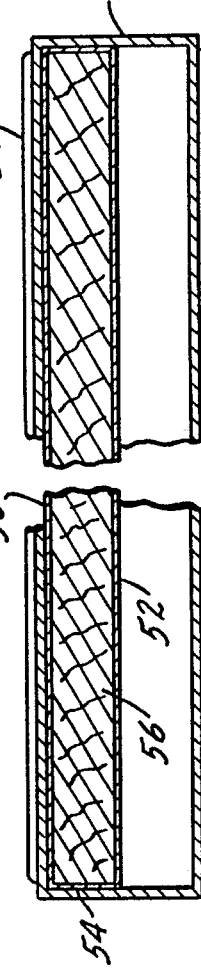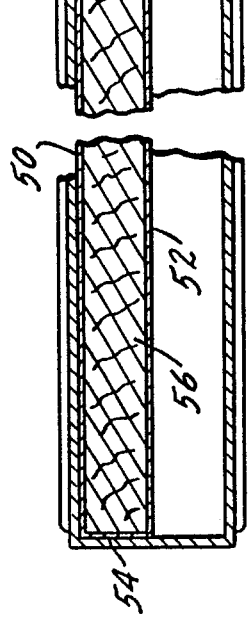

RAIL CAR BRIDGE PLATE

This is a continuation-in-part of application Ser. No. 08,161,755, filed Dec. 3, 1993, now abandoned.

THE FIELD OF THE INVENTION

The present practice in loading automotive type motor vehicles including light trucks, vans, and sport utility vehicles onto railroad multi-level auto rack freight cars (freight cars) for shipment by rail is to drive the motor vehicle onto one end of a string of freight cars coupled together. The motor vehicles are driven into the first freight car on either the first, second, or third deck, depending upon the type and size of multi-level auto rack freight car, with the gap between the adjoining decks of adjacent freight cars being spanned by a pair of portable bridge plates. Each pair of bridge plates supports the motor vehicle as it is driven over the gap between the decks of adjacent freight cars with one plate supporting the right side and the other the left side of the motor vehicle. Conventionally, the portable bridge plates are mounted to the freight cars only during loading and unloading of the motor vehicles. The Association of American Railroads (AAR) specifies a maximum weight of 40 pounds and a minimum strength requirement of 4500 pounds and a fatigue load of 1500 pounds for portable bridge plates in AAR Specification M-951. Conventionally, portable bridge plates are made of aluminum plate with a steel hinge and weigh between 37 and 40 pounds, but nevertheless, they are still difficult for both male and female employees (workmen) to handle during installation and/or removal and often are the cause of personal injury, as well as damage to the plate itself. Conventionally, the portable bridge plates are pivotally attached to one end of one freight car and span the gap to the deck of the adjacent freight car. The portable bridge plates are only attached to a freight car at one end so as to accommodate variable spacing between adjacent coupled freight cars in the string that have been spotted for loading and/or unloading. Pivotal attachment is by a spring-biased latch which has limited accessibility as the latch can only be accessed from the bottom of the bridge plate, again making the job of the workmen more difficult during installation and removal at certain deck positions.

A further problem with the present type of portable bridge plate is that its size is not sufficient to accommodate recent and future changes to motor vehicle and freight car designs. The problem with the present type of portable bridge plate is that its width is not sufficient to accommodate motor vehicles with narrow tracks now being used on some subcompact and future motor vehicle designs. These motor vehicles' lateral wheel spacing is too narrow and cannot properly span the distance between the pair of portable bridge plates. Without extreme care, these motor vehicles may fall between the bridge plates spanning the gap between adjacent freight cars. Some motor vehicle manufacturers have advised that this track dimension will be reduced even further in the future.

A further problem with the present portable bridge plate is that it cannot accommodate a recent increase in the gap between adjacent freight cars. AAR Specification M-921D relative to freight car draft gear requires all freight cars to be modified over the next four years. The new specification requires a 50,000 pound pre-load to be built into each freight car draft gear to reduce in-train longitudinal forces. The old specification had no pre-load and the freight cars could be easily bunched together to accommodate the present bridge plate design. Now with the required pre-load, the freight cars cannot be bunched as close together and the present portable bridge plate is too short to properly span the gap between adjacent freight car decks. No longer will it be possible to set the hand brake at one end of a string of freight cars being positioned for loading or unloading of motor vehicles and then compress the freight cars together by applying force from an engine at the opposite end. The pre-load required by AAR Specification M-921D will not allow the draft gears to compress (the end freight car wheels will slide on the rail with the hand brake set) allowing the space between freight cars to be reduced using this compressing method with the result that the current portable bridge plate will not be able to properly span the gap between the decks of adjacent freight cars. To make the portable bridge plates of the current design wider and longer and meet the AAR minimum loading requirements would cause the plates to weigh more than the AAR mandated 40 pounds maximum.

A further problem with the present type of portable bridge plate is that the non-pivotally attached end of the plate rests on the adjacent freight car deck. However, because of the variable gap between adjacent freight cars and the several designs of different manufacturers of auto racks, the bridge plate often rests upon obstructions such as door locks, chain rails and chock rails. When the plate rests upon these obstructions the vertical height for the motor vehicle is reduced leading to roof damage of the vehicle and the end of the bridge plate presents a sharp metal edge that can damage the motor vehicle rubber tires.

A further problem with the present type of portable bridge plate is that its top surface is painted with an antiskid paint to provide traction and a bright safety color as the motor vehicle is driven across. This paint wears off with usage and is a high maintenance item. Also, the shape of the present plate allows it to collect water, snow and ice which reduces traction and often falls on the workmen during removal.

An additional problem with the present portable bridge plate is that the top and bottom are not reversible, requiring the workman to pick it up in the proper orientation to install it on the freight car or set it down and reorient his handhold. This is not always easy to accomplish since the workman may be as high as fourteen feet above the rails. A further problem with the present portable bridge plate is that it does not have a handhold at the non-locking end.

The present invention provides a lightweight, easily handled, reversible portable bridge plate assembly which has sufficient width to handle narrow track motor vehicles and is variable in length to span any reasonable gap between decks of adjacent freight cars and will not rest on floor obstructions that would cause motor vehicle damage. The maximum weight is approximately 30 pounds. The portable bridge plate assembly is formed of a pair of telescoping panel members, each of which has sandwiched panels comprised of thin, high strength facing layers bonded to a much thicker intermediate low density and lightweight core material. The bond is formed by a touch but rigid adhesive attaching the facings to the core. Each panel member is pivotally attached to one end of a freight car with a spring-biased latch which is accessible from either the top and bottom through a hand opening used by the workmen to move and orient the portable bridge plate during installation and removal. Transverse braces secure the telescoping bridge plate panels together providing a lightweight, variable length, reversible, high load-resistant assembly to easily move motor vehicles from one freight car to another without damage.

SUMMARY OF THE INVENTION

The present invention relates to portable bridge plates for use in loading and unloading automotive type motor vehicles onto and off of freight cars and particularly relates to a lightweight, easily installed and removed portable bridge plate assembly in which each of the panel members has a sandwich construction comprised of thin, high strength facing layers top and bottom bonded with a tough but rigid adhesive to an intermediate, much thicker, low density and lightweight core material.

Another purpose of the invention is a portable bridge plate assembly which weighs substantially less than the AAR maximum weight limitation of 40 pounds, meets the AAR minimum strength requirements, has sufficient width to be useful with all automotive type motor vehicle designs, including narrow tracked motor vehicles, and has adequate length to span the gap between the decks of adjacent freight cars.

Another purpose of the invention is a portable bridge plate assembly that has adjustable length to span the variable gap between decks of adjacent freight cars by using a pair of telescoping panel members, each of which is pivotally attached to an end of adjoining freight cars.

Another purpose of the invention is a portable bridge plate that has a handhold at each end to improve the ease of handling by the workmen.

Another purpose of the invention is a portable bridge plate wherein the spring biased locking mechanism of the pivot is accessible from both the top and bottom of the bridge plate.

Another purpose of the invention is a portable bridge plate that is reversible for ease of use by the workmen.

Another purpose of the invention is a portable bridge plate that clears all floor obstructions of various freight car deck designs, thus providing maximum motor vehicle vertical clearance.

Another purpose of the invention is a portable bridge plate that has an as-molded, non-painted antiskid texture on the panel surface to provide maximum traction for the motor vehicle.

Another purpose of the invention is a portable bridge plate as described having a panel member formed with top and bottom face layers, either metallic or fiber reinforced plastic, with an intermediate core which may, for example, be wood such as balsa, or may be a honeycomb cellular configuration.

BRIEF DESCRIPTION OF THE DRAWINGS

The invention is illustrated diagrammatically in the following drawings wherein:

FIG. 3 is a side view of the bridge plate assembly;

FIG. 4 is a side view of the upper plate member;

FIG. 5 is an end view of the plate member of FIG. 4;

FIG. 6 is a partial enlarged side view of the mounting hinge with the pins removed;

FIG. 7 is a vertical section through the bridge plate assembly;

FIG. 8 is an enlarged vertical section illustrating a honeycomb core; and

FIG. 9 is a top view of the core of FIG. 8.

DESCRIPTION OF THE PREFERRED EMBODIMENT

Figure 1:
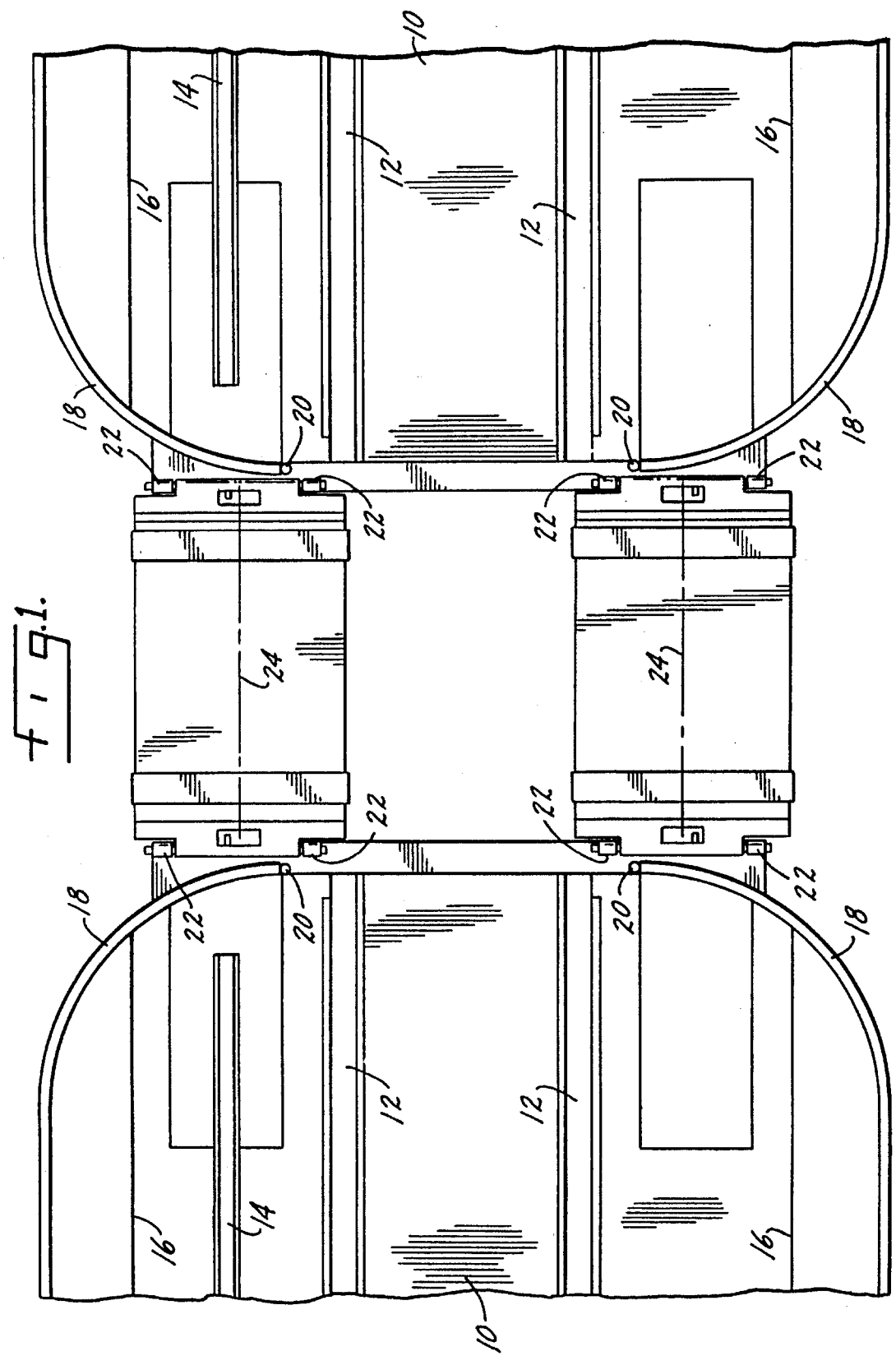
FIG. 1 is a top plan view of the adjoining ends of rail cars showing the bridge plate assembly of the present invention in position.

In the drawings, one end of a typical rail car for use in transporting automotive type vehicles has a floor 10 with spaced chain rails 12. Outboard of one of the chain rails 12 is a wheel chock track 14. One set of the vehicle wheels will pass between the chock track 14 and the chain rail 12, with the vehicle being chained to the chain rail and chocks being used to restrain the vehicle wheels. The interior walls of the rail car are indicated at 16, and as is conventional, there are arcuate doors at each end, with the track for the doors being shown at 18 and the door stops being indicated at 20. At each end of the car, there are barrel rings 22, there being a pair of such rings for each bridge plate assembly, with the centerline 24 of each bridge plate assembly being intermediate the barrel rings. Each bridge plate assembly must be sufficient in width to accommodate both wide track and narrow track vehicles and in fact automotive type vehicles of almost any wheelbase which can fit within the confines of the multideck rail car.

Each bridge plate assembly includes an upper plate member 26 and a lower plate member 28. These designations are only for descriptive purposes, as the plate assembly is reversible and so either plate member may function as the top. There will be a pivotal or hinge connection at the left side of the upper plate member 26 and at the right side of the lower plate member 28. The upper and lower plate members are relatively movable to provide a telescopic adjustable length interconnection which permits a minimum distance between the pivotal hinge connections of about 46 inches and a maximum distance between the hinge connections up to about 56 inches. This is consistent with the distance between rail cars presently in use. The plate members 26 and 28 are secured together by transverse braces 30 and 32. Brace 30 is attached to upper plate member 26 and brace 32 is attached to lower plate member 28. The braces which may be termed sliders in that they permit the sliding of one plate member relative to another, have a ribbed outer surface 34 which provides both reinforcement for the brace as well as increased traction for the vehicle being driven over the bridge member. Each of the braces is attached to its respective plate member by mechanical fasteners or by a form of bonding agent, depending upon the specific construction of the plate member. What is important is that the braces permit telescopic relative adjustable movement of the plate members, but yet provide firm load bearing connections between the plate members when installed in a final position between the adjacent ends of rail cars.

The upper or outer surface of each of the plate members may be treated to provide additional traction for the vehicles being driven between adjoining rail cars. Depending upon the outer surface of each plate member as described hereinafter, the outer surface may have sand, fine particles, grit or the like molded into the surface during formation of the plate member for purposes of increasing traction. In addition, the resin used to form the facing layer may have a bright safety color pigment added thereto to eliminate the need for subsequent painting.

Figure 2:
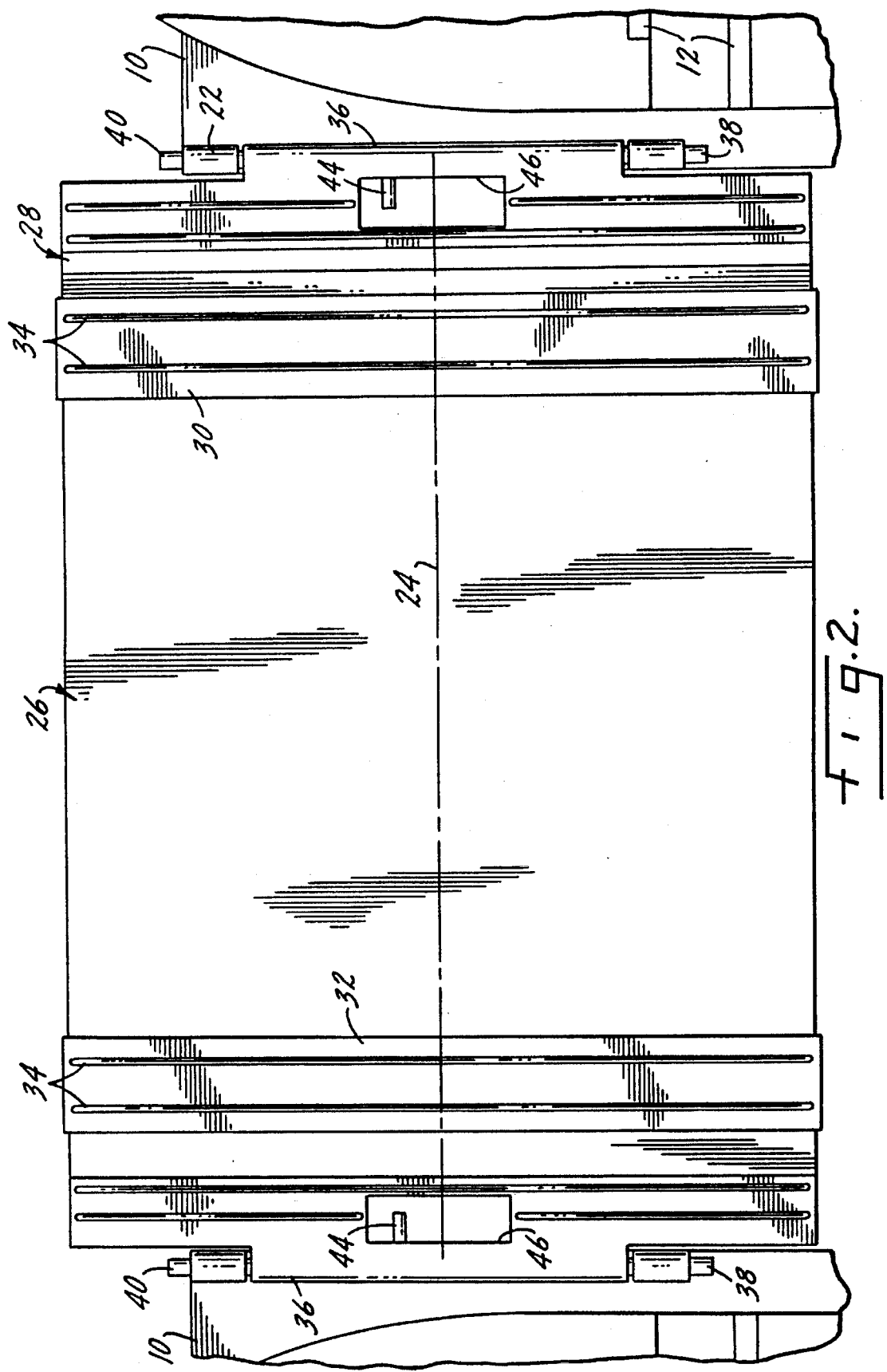
FIG. 2 is an enlarged top view of the bridge plate assembly.

As noted in the top plan view of the rail car, there are two barrel rings for attaching each bridge plate assembly. The end of each plate member which will form the pivotal attachment with the barrel ring has an integral sleeve 36 from which extends a fixed pin 38, which will extend into one of the barrel rings during mounting of the bridge plate assembly. At the opposite end of sleeve 36 there is a sliding pin 40 which is biased in an outward direction by an internal return spring 42. Pin 40 has a pin handle 44 attached thereto which extends through a slot 43 in sleeve 36. Handle 44 is used to retract the pin during mounting. As particularly shown in FIG. 2, pin handle 44 is accessible to a workman, from either above or below the plate assembly, through an opening 46 in that end of each plate member adjacent the hinge connection. The openings 46 not only provide easy access to the pin handle for mounting, but also provide a hand hold where the workman may grasp the assembly with ease during installation. This is to be contrasted with the present bridge plates which are extremely difficult to handle, both because of the weight and because of the lack of any readily accessible hand gripping area.

In mounting the bridge plate assembly, a workman will first connect one end of the assembly with one end of a rail car by first inserting the fixed pin into the one barrel ring while retracting the sliding pin until it is in alignment with the opposite barrel ring. The sliding pin can then be released and one end of the bridge plate assembly is then secure. The two plates are moved relative to each other until the opposite end of the bridge plate assembly is in position for attachment to the adjoining car in the same manner.

As indicated earlier, the AAR has a maximum weight for bridge plates of 40 lbs. Present-day bridge plates are not adequate to span the distance between adjoining rail cars with the new AAR draft gear requirements, nor do they have sufficient width to accommodate narrow tracked vehicles. The need is for a lightweight, weather-resistant bridge plate assembly which is compatible to the current fleet of rail cars capable of supporting motor vehicles weighing up to approximately 6,000 lbs. and which will span a maximum distance between cars of up to 56 inches.

The present invention provides a bridge plate assembly utilizing a pair of plate members, each of which is light in weight and made of a composite laminate having top and bottom face layers bonded to an intermediate low density core. The maximum weight will vary, depending upon the specific construction, but will be no more than about 30 lbs. As shown in the drawings, each plate member has a peripheral outer layer which provides an upper layer or face surface 50, a bottom face surface or layer 52 and an edge 54. This surface laminate encloses a core 56. It is important that the core being of low density and light in weight. A preferred material is balsa wood, although there are a number of other materials which are satisfactory for the core. A honeycomb construction is also acceptable. J. D. Lincoln, Inc. of Costa Mesa, Calif., manufactures a number of composite cores which may be suitable for use in the described environment. Acceptable core materials are the described end-grain balsa, an aramid fiber paper/phenolic resin honeycomb core sold by DuPont under the trademark Nomex, and an aluminum core formed into a honeycomb configuration. Crushed honeycomb panels are acceptable, as are foam panels made from polymethacryliminide, polyvinyl chloride, polystyrene and polyurethane. The facing layer may also be made of a wide variety of materials. What is important is that the facing layers be rigidly bonded to the core. A carbon/epoxy or carbon/phenolic material has been found to be satisfactory as a surface layer, as have various fiber reinforced plastics such as E-glass, S2 glass or carbon-type fabrics. Fiberglass laminates with epoxy are satisfactory, as are laminates with phenolic, polyester and polyimide resins. Aluminum is satisfactory in certain instances. As long as the face material is securely bonded to the core with a rigid adhesive, the composite provides a lightweight, extremely strong, durable plate member for the use described.

FIGS. 8 and 9 illustrate a honeycomb core formed of aluminum and bonded to a surface layer of aluminum by a rigid adhesive as described. The honeycomb core is indicated at 60, the layer of rigid adhesive at 62, and the facing layers are indicated at 64.

The described laminates are manufactured by applying heat and pressure over time to a sandwich including a central core, layers of adhesive adjacent the core, and facing layers of a suitable fabric. Typical sandwich materials are described as facings of reinforced fiberglass and carbon (woven or uni-directional) and aluminum; adhesives of epoxy, phenolic, and polyester; and cores of foam, end grain balsa wood, and aluminum and aramid honeycombs.

It is also within the scope of the invention to use hybrid facing layers on both the top and bottom of the panels. By hybrid facing layers we mean a layer in which there is a combination of several of the described facing materials used selectively to meet desired strength requirements in different areas of each panel. Such hybrid facing layers will be bonded by a rigid adhesive such as an epoxy, polyester or heatsetting elastomer to one of the described core materials.

Whereas the preferred form of the invention has been shown and described herein, it should be realized that there may be many modifications, substitutions and alterations thereto.

The embodiments of the invention in which an exclusive property or privilege is claimed are defined as follows:

1. A portable bridge plate assembly attachable to and removable from facing ends of rail cars for use in moving vehicles between rail cars for loading and unloading, said plate assembly having sufficient length to span the space between adjacent rail cars and having sufficient width to accommodate vehicles of varying wheelbase, said plate assembly including two load bearing plate members, said plate members being secured together for telescopic relative movement to provide for adjustment of the plate assembly length during rail car attachment, with one end of each plate member having means thereon for pivotally securing the plate member to the end of a rail car, said securing means including a movable latch at said one end of each plate member, operating means for each movable latch, and a hand opening in each said one end of each plate member adjacent each movable, latch, the operating means for each movable latch being accessible through the adjacent hand opening.

2. The bridge plate assembly of claim 1 wherein one of said plate members has top and bottom face layers bonded to an intermediate low density core.

3. The bridge plate assembly of claim 2 wherein the core is non-metallic.

4. The bridge plate assembly of claim 3 wherein said core is wood.

5. The bridge plate assembly of claim 4 wherein said core is formed of balsa wood.

6. The bridge plate assembly of claim 3 wherein said core is a plastic foam.

7. The bridge plate assembly of claim 2 wherein said face layers are bonded to the core with a rigid adhesive.

8. The bridge plate assembly of claim 2 wherein said core has a honeycomb configuration.

9. The bridge plate assembly of claim 8 wherein said honeycomb configuration is metallic.

10. The bridge plate assembly of claim 9 wherein said honeycomb configuration is formed of aluminum.

11. The bridge plate assembly of claim 8 wherein said honeycomb core is made from an aramid fiber paper.

12. The bridge plate assembly of claim 2 wherein said face layers are formed of aluminum.

13. The bridge plate assembly of claim 2 wherein said face layers are formed of carbon.

14. The bridge plate assembly of claim 2 wherein said face layers are formed of a carbon/phenolic material.

15. The bridge plate assembly of claim 2 wherein said face layers are formed of a carbon/epoxy material.

16. The bridge plate assembly of claim 1 wherein the means for securing one end of each plate member to the end of a rail car include a spring-biased latch.

17. The bridge plate assembly of claim 1 including brace means for attaching said plate members one to another.

18. The bridge plate assembly of claim 17 wherein said brace means extend transversely across said plate members.

19. The bridge plate assembly of claim 18 wherein said brace means includes a pair of transverse brace elements with each of said brace elements securing both plate members to each other.

20. The bridge plate assembly of claim 1 wherein said assembly is reversible so that either plate member may be the top plate.

21. The bridge plate assembly of claim 1 wherein a surface of each plate member has an antiskid texture facing thereon.

22. The bridge plate assembly of claim 1 wherein each plate member has top and bottom face layers bonded to an intermediate low density core.

23. The bridge plate assembly of claim 22 wherein each of said low density cores is non-metallic.

24. The bridge plate assembly of claim 23 wherein each of said cores is formed of wood.

25. The bridge plate assembly of claim 24 wherein each of said cores is formed of balsa wood.

26. The bridge plate assembly of claim 22 wherein each of said cores has a honeycomb configuration.

27. The bridge plate assembly of claim 22 wherein each of said face layers includes graphite.

28. The bridge plate assembly of claim 22 wherein each face layer has a bright safety color integrally added thereto.

* * * * *